(12) United States Patent
Hiyama (10) Patent No.: US 10,792,607 B2
(45) Date of Patent: Oct. 6, 2020

(54) FLUX RECOVERY DEVICE, SOLDERING DEVICE AND METHOD FOR REMOVING FLUX

(71) Applicant: SENJU METAL INDUSTRY CO., LTD., Tokyo (JP)

(72) Inventor: Tsutomu Hiyama, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/807,390

(22) Filed: Mar. 3, 2020

(65) Prior Publication Data

US 2020/0282355 A1  Sep. 10, 2020

(30) Foreign Application Priority Data

Mar. 8, 2019  (JP) .................................. 2019-042406

(51) Int. Cl.
| | | |
|---|---|---|
| *B01D 47/02* | (2006.01) | |
| *B01D 46/30* | (2006.01) | |
| *B23K 1/20* | (2006.01) | |

(52) U.S. Cl.
CPC ............. *B01D 47/02* (2013.01); *B01D 46/30* (2013.01); *B23K 1/203* (2013.01)

(58) Field of Classification Search
None
See application file for complete search history.

(56) References Cited

U.S. PATENT DOCUMENTS

2016/0250705 A1   9/2016  Hiyama et al.

FOREIGN PATENT DOCUMENTS

| | | |
|---|---|---|
| CN | 10939556 A | 3/2019 |
| EP | 3064304 A1 | 9/2016 |
| JP | 2002-217534 A | 8/2002 |
| JP | 2006-339375 A | 12/2006 |

(Continued)

OTHER PUBLICATIONS

Decision to Grant a Patent in corresponding Japanese Patent Application No. 2019-042406, dated Oct. 30, 2019, with machine translation.

(Continued)

*Primary Examiner* — Christopher P Jones
*Assistant Examiner* — Phillip Y Shao
(74) *Attorney, Agent, or Firm* — Harness, Dickey & Pierce, P.L.C.

(57) ABSTRACT

To provide a flux recovery device which can remove a flux in a pipe and a method for removing a flux. A flux recovery device 200 according to the present invention recovers a flux from a gaseous mixture containing a flux component, the flux recovery device 200 including: a separation unit 400 configured to separate the flux from the gaseous mixture using water, and to discharge the water containing the flux; a pipe 500 including a second connection port 540, an inclined portion 580, and a first connection port 520, the water containing the flux flowing into the pipe 500 from the second connection port 540, the inclined portion 580 being positioned on a downstream side of the second connection port 540, and extending in a direction intersecting with a vertical line extending in a gravity direction, and the first connection port 520 being positioned on an upstream side of the inclined portion 580; and a pump 220 configured to supply water from the first connection port 520.

9 Claims, 3 Drawing Sheets

(56) References Cited

FOREIGN PATENT DOCUMENTS

| JP | 2007053158 A | 3/2007 |
| JP | 5761466 B1 | 8/2015 |
| JP | 2017072109 A | 4/2017 |
| WO | WO-2015/064143 A1 | 5/2015 |

OTHER PUBLICATIONS

Extended European Search Report in corresponding European patent application No. 20159417.3 dated Jun. 30, 2020.

FLUX RECOVERY DEVICE, SOLDERING DEVICE AND METHOD FOR REMOVING FLUX

CROSS-REFERENCE TO RELATED APPLICATION

This application is based upon and claims benefit of priority from Japanese Patent Application No. 2019-042406 filed on Mar. 8, 2019, the entire contents of which are incorporated herein by reference.

TECHNICAL FIELD

The present invention relates to a flux recovery device, a soldering device, and a method for removing a flux.

BACKGROUND ART

In fixing an electronic component to a circuit board by soldering, a soldering device is used, such as a reflow furnace or a jet soldering device. In performing soldering, a flux is applied to a portion of the circuit board where the soldering is to be performed. The flux removes oxide films on the surface of metal on which soldering is to be performed. Further, the flux prevents reoxidation of the surface of the metal at the time of performing heating in a soldering step. A solid component, such as rosin, a thixotropic agent and an activator, is mainly dissolved in a solvent, thus forming a flux. In the case where the flux is applied to a circuit board, for example, in the case where a reflow furnace is used, a solder paste, where the flux and solder powder are mixed into a paste, is used. In the case where a jet soldering device is used, the flux is directly applied to a board by a fluxer.

With respect to the flux applied as the solder paste or applied by the fluxer, in a preheating unit, which is disposed upstream of a place where soldering is performed, a solvent in a flux component particularly vaporizes, thus forming flux fume. Further, in a heating unit where soldering is performed, particularly a solid component, such as rosin, in the flux component vaporizes, thus forming flux fume, and floats in the device. When the flux fume comes into contact with a portion in the device having a relatively low temperature, for example, a chain conveyor or the like which conveys circuit boards, the flux fume is cooled and condensed. When the temperature of the flux fume further decreases, the flux fume is formed into a solid matter having adhesiveness. Adhesion or deposition of this solid matter to or on respective portions in the device may cause a problem in the soldering device. For example, in the case where a large amount of solid matter adheres to the chain conveyor, a circuit board does not separate from the conveyor, thus being caught into the sprocket of the conveyor and, as a result, the circuit board is damaged. Further, if the solid matter adheres to the circuit board during conveyance, the circuit board may be stained. Accordingly, a flux recovery device is used which separates and removes a flux component from a gaseous mixture of the atmosphere in the soldering device or an inert atmosphere, such as nitrogen, and a flux component.

One example of the flux recovery device is disclosed in PTL 1. A flux recovery device disclosed in PTL 1 includes a first water spray unit which sprays water into a gaseous mixture, and a separation unit which separates a flux component from the gaseous mixture. Further, the separation unit includes an introduction part, a cylindrical body for separating a flux component, and a lid part. The introduction part is formed at the upper side portion of the separation unit, and a gaseous mixture is introduced into the separation unit through the introduction part. The cylindrical body has an opening portion on the upper portion thereof, and has a conical part on the lower portion thereof. The lid part is engaged with the opening portion of the cylindrical body. The lid part includes a disk-shaped body portion, and an exhaust cylindrical portion having a predetermined length penetrates the body portion. Further, the conical part has a drainage port.

According to the flux recovery device, when a gaseous mixture is taken into the introduction part from the tangential direction of the cylindrical body, the gaseous mixture forms a swirling flow in a state of being mixed with water. A flux contained in the gaseous mixture is cooled by water supplied into the separation unit. With such cooling, most of the flux starts to be liquefied or solidified, and the flux is coated by sprayed moisture. That is, the flux is mixed with water to become water containing the flux, thus being removed from the gaseous mixture. Thereafter, the water containing the flux is separated from the swirling flow, and is drained from the drainage port. Further, a gas from which the flux is removed is suctioned out from the cylindrical portion. Accordingly, this flux recovery device can separate the flux from the gaseous mixture.

This flux recovery device further includes a water purifying device which purifies water containing the flux and recovered from the separation unit. This water purifying device is coupled to the drainage port of the separation unit. With such a configuration, the water containing the flux is delivered from the separation unit to the water purifying device. The water containing the flux is purified by the water purifying device so that the flux is removed from the water containing the flux.

CITATION LIST

Patent Literature

PTL 1: Japanese Patent No. 5761466

SUMMARY OF INVENTION

Technical Problem

As described above, in the flux recovery device disclosed in PTL 1, the flux component contained in the gaseous mixture is cooled by water so that most of the flux is liquefied or solidified. Accordingly, the water containing the flux and drained from the drainage port contains a large amount of liquefied or solidified flux. Particularly, the flux becomes a liquid with an extremely high viscosity when the flux is at a low temperature.

Further, when water containing the flux flows from the separation unit to the water purifying device, the water flows through the inside of a pipe which couples the separation unit and the water purifying device with each other. According to design specifications, the pipe, which couples the separation unit and the water purifying device with each other, may be disposed to extend in any of various directions corresponding to the arrangement of respective components which form the flux recovery device. In the case where the pipe is disposed to extend in the gravity direction, the flux which is liquefied with a high viscosity flows downstream slowly through the inside of the pipe due to gravity. However, in the case where the pipe is disposed to extend in a direction other than the gravity direction, there is a concern that the flux adheres to the inner wall of the pipe thus blocking the pipe. Particularly, in the case where the pipe is disposed to extend in a horizontal direction or a direction close to the horizontal direction, a problem becomes apparent where the flux adhering to the inner wall blocks the pipe.

In view of the above, the present invention has been made to solve such problems, and it is an object of the present invention to provide a flux recovery device which can remove a flux in a pipe and a method for removing a flux.

Solution to Problem (Mode 1)

The flux recovery device according to a mode 1 is a flux recovery device which recovers a flux from a gaseous mixture containing a flux component, the flux recovery device including: a separation unit configured to separate the flux from the gaseous mixture using water, and to discharge the water containing the flux; a pipe including a second connection port, an inclined portion, and a first connection port, the water containing the flux flowing into the pipe from the second connection port, the inclined portion being positioned on a downstream side of the second connection port, and extending in a direction intersecting with a vertical line extending in a gravity direction, and the first connection port being positioned on an upstream side of the inclined portion; and a pump configured to supply water from the first connection port.

In the flux recovery device according to the mode 1, even in the case where a flux adheres to the inclined portion, water supplied by the pump flows through the inclined portion, thus flushing out this adhering flux. That is, this flux recovery device can remove a flux in the pipe.

(Mode 2)

According to the flux recovery device of a mode 2, in the flux recovery device described in the mode 1, a pressure of the water supplied from the first connection port by the pump is higher than a pressure of the water containing the flux and flowing into the pipe from the second connection port.

The flux recovery device according to the mode 2 can apply, to the inclined portion, a pressure higher than the pressure of the water containing the flux and flowing into the pipe from the second connection port. Accordingly, this flux recovery device can flush out, with a higher water pressure, a flux which cannot be flushed out with the pressure of water which flows into the pipe from the second connection port.

(Mode 3)

According to the flux recovery device of a mode 3, in the flux recovery device described in the mode 1 or the mode 2, a pressure difference between the pressure of the water supplied from the first connection port by the pump and a pressure on a downstream side of the inclined portion is 0.1 MPa or more.

The flux recovery device according to the mode 3 can flush out a flux adhering to the inclined portion with a pressure of 0.1 MPa or more.

(Mode 4)

According to the flux recovery device of a mode 4, in the flux recovery device described in any one of the modes 1 to 3, the inclined portion includes a straight pipe portion which extends straight, a portion of the pipe between a position where the first connection port is formed and a downstream end portion of the straight pipe portion extends straight, and the water supplied from the pump is injected toward the straight pipe portion.

In the flux recovery device according to the mode 4, the water supplied from the pump is injected toward the straight pipe portion. Accordingly, it is possible to flush out a flux adhering to the straight pipe portion with injection pressure.

(Mode 5)

According to the flux recovery device of a mode 5, in the flux recovery device described in any one of the modes 1 to 4, the pump supplies the water also to the separation unit.

The flux recovery device according to the mode 5 can use the same pump as the pump which supplies the water to the separation unit and as the pump which supplies the water to the first connection port.

(Mode 6)

In the flux recovery device described in the mode 5, the flux recovery device according to a mode 6 further includes a purifying device to which water containing the flux and discharged from the separation unit is supplied, and which is configured to separate the flux from the water containing the flux to recover the flux, wherein the pump supplies, to the first connection port and the separation unit, water separated from the water containing the flux by the purifying device.

According to the flux recovery device of the mode 6, water purified by the purifying device can be used for removing a flux. That is, it is not necessary for the flux recovery device to newly include another water supply source for supplying water to be used to remove a flux adhering to the inclined portion.

(Mode 7)

In the flux recovery device described in any one of the modes 1 to 6, the flux recovery device according to a mode 7 further includes a control unit configured to control supply of the water supplied to the first connection port by the pump.

According to the flux recovery device of the mode 7, it is possible to automatically remove a flux in accordance with the control performed by the control unit.

(Mode 8)

According to the flux recovery device of a mode 8, in the flux recovery device described in the mode 7, the control unit controls the supply of the water at predetermined time intervals.

The flux recovery device according to the mode 8 can remove a flux at predetermined time intervals.

(Mode 9)

A soldering device according to a mode 9 includes: a solder processing unit; and the flux recovery device described in any one of claims 1 to 8 and configured to recover a flux from a gaseous mixture containing a flux component and generated in the solder processing unit.

In the same manner as the mode 1, the soldering device according to the mode 9 can remove a flux in the pipe.

(Mode 10)

A method for removing a flux according to a mode 10 includes the steps of: separating a flux from a gaseous mixture containing a flux component using water, and discharging the water containing the flux; causing the water containing the flux to flow into a pipe from a second connection port, the pipe including the second connection port, an inclined portion positioned on a downstream side of the second connection port, and extending in a direction intersecting with a vertical line extending in a gravity direction, and a first connection port positioned on an upstream side of the inclined portion; and supplying water to the first connection port.

According to the method for removing a flux of the mode 10, even in the case where a flux adheres to the inclined portion, water supplied from the first connection port flows through the inclined portion, thus flushing out this adhering flux. That is, this method for removing a flux can remove a flux in the pipe.

Advantageous Effects of Invention

According to the present invention, it is possible to remove a flux in the pipe.

DETAILED DESCRIPTION OF INVENTION

Hereinafter, embodiments of the present invention will be described with reference to drawings. In the drawings described hereinafter, identical or corresponding constitutional elements are given the same reference numerals, and the repeated description will be omitted.

First Embodiment

<Configuration>
(Overall Configuration)

Figure 1:
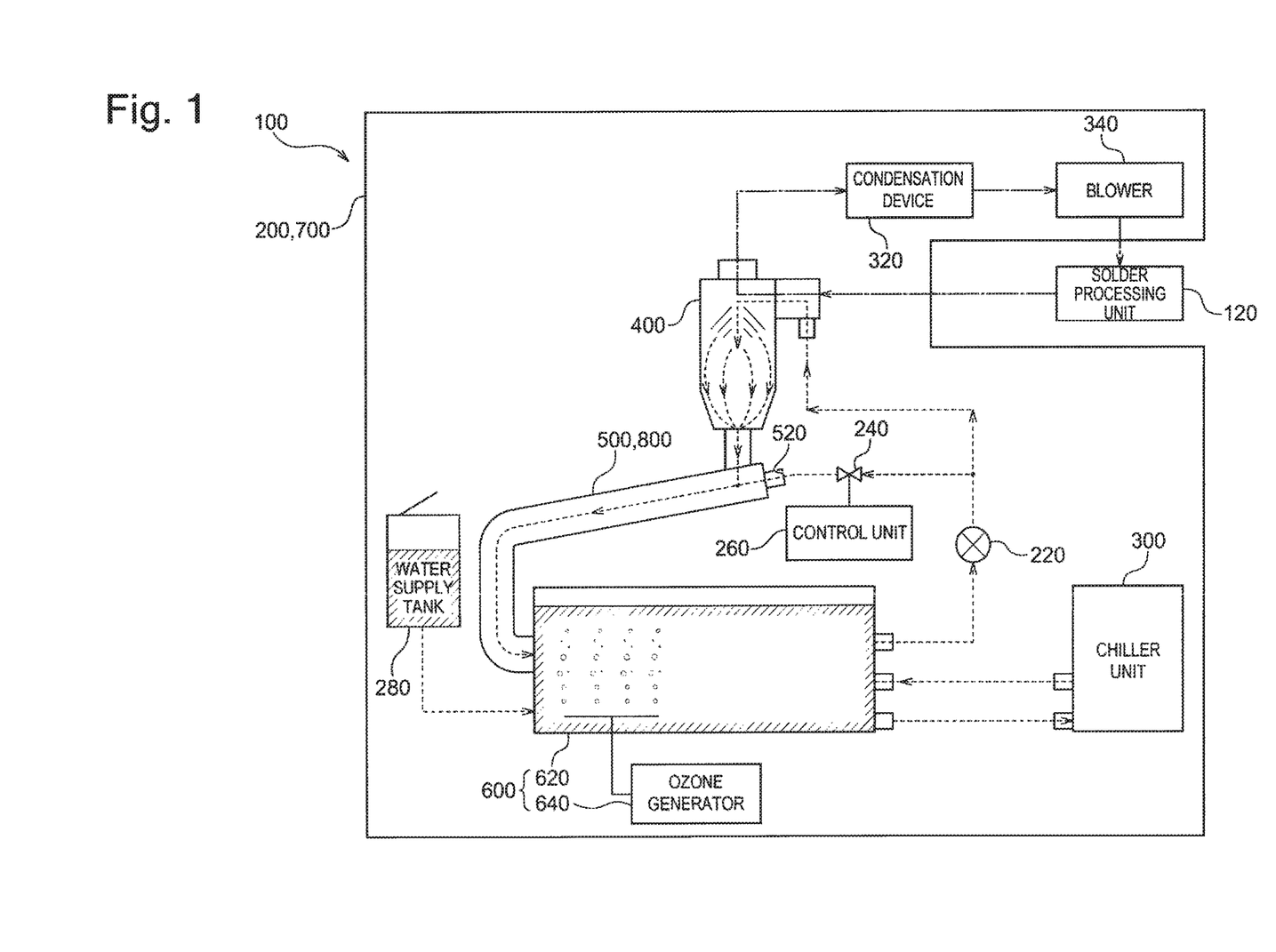
FIG. 1 is a structure diagram showing a configuration of a soldering device which includes a flux recovery device according to a first embodiment of the present invention.

FIG. 1 is a structure diagram showing a configuration of a soldering device which includes a flux recovery device according to a first embodiment of the present invention. Referring to FIG. 1, a soldering device 100 includes a solder processing unit 120 and a flux recovery device 200. The soldering device 100 is a device which fixes, for example, an electronic component to a board by soldering.

Hereinafter, respective constitutional elements of the soldering device 100 will be separately described.

The solder processing unit 120 performs processing relating to soldering, such as fixing an electronic component to a circuit board by soldering or preheating the circuit board, for example. In the solder processing unit 120, circuit boards to which a flux is applied are used to smoothly perform soldering. Accordingly, the flux vaporizes due to the soldering and preheat of the circuit boards, and floats in the solder processing unit 120. That is, the inside of the solder processing unit 120 is filled with a gaseous mixture containing a flux component. In this specification, a gaseous mixture means a gas where a gasified flux, which is generated during the soldering, and a gas which is present in the solder processing unit 120 from the beginning are present in a mixed manner.

The flux recovery device 200 is a device which recovers a flux from a gaseous mixture containing a flux component. The flux recovery device 200 is connected with the solder processing unit 120. The flux recovery device 200 can recover a flux from the gaseous mixture in the solder processing unit 120, and can supply a gas from which the flux is recovered to the solder processing unit 120. The flux recovery device 200 includes a separation unit 400, a pipe 500, a purifying device 600, a pump 220, a valve 240, a control unit 260, a water supply tank 280, a chiller unit 300, a condensation device 320, and a blower 340, for example.

The separation unit 400 is in fluid communication with the solder processing unit 120, and can suction a gaseous mixture from the solder processing unit 120. Further, the separation unit 400 has a function of separating a flux from the suctioned gaseous mixture by a known method. More specifically, the separation unit 400 causes water to be mixed into the gaseous mixture. With such an operation, the flux contained in the gaseous mixture is cooled by water. The cooled flux is liquefied or solidified. With such liquefaction or solidification, the flux contained in the gaseous mixture is separated so that the flux is removed from the gaseous mixture. Further, the liquefied or solidified flux is coated by water used for the separation of the flux, and is discharged from the separation unit 400. Accordingly, water containing the flux is discharged from the separation unit 400 to the pipe 500.

The condensation device 320 is in fluid communication with the separation unit 400, and a gas from which the flux is removed in the separation unit 400 is supplied to the condensation device 320 from the separation unit 400. As described above, the flux is separated from a gaseous mixture using water in the separation unit 400. Accordingly, the gas from which the flux is removed by the separation unit 400 includes a large amount of water vapor. The condensation device 320 has a function of removing water vapor from the gas from which the flux is removed. Further, the condensation device 320 removes water vapor from the gas from which the flux is removed and, thereafter, supplies this gas from which water vapor is removed to the blower 340.

The blower 340 is in fluid communication with the condensation device 320. The blower 340 has a function of suctioning a gas from which water vapor is removed from the condensation device 320, and blowing this gas from which water vapor is removed to the solder processing unit 120.

The pipe 500 connects the separation unit 400 and a purification tank 620 of the purifying device 600 with each other. The pipe 500 has a function of supplying water containing the flux and discharged from the separation unit 400 to the purification tank 620. The detailed configuration of the pipe 500 will be described later.

The purifying device 600 includes the purification tank 620 and an ozone generator 640, for example. The purifying device 600 stores the supplied water containing the flux in the purification tank 620. Further, the ozone generator 640 supplies ozone bubbles to the purification tank 620. With such a configuration, the purifying device 600 decomposes the flux using ozone. Thereafter, the purifying device 600 causes water containing decomposition products of the flux to pass through a filter. With such an operation, the decomposition products are adsorbed by the filter and hence, the purifying device 600 can purify water containing the flux.

Further, the purifying device 600 is in fluid communication with the separation unit 400 via the pump 220. With such a configuration, the pump 220 can supply the water purified by the purifying device 600 to the separation unit 400. Accordingly, water is allowed to flow through the separation unit 400, the pipe 500, the purifying device 600, and the pump 220 in this order. Further, the pump 220 supplies the water purified by the purifying device 600 also to a first connection port 520 of the pipe 500 in addition to the separation unit 400. The valve 240 is provided between the pump 220 and the first connection port 520. Accordingly, adjusting the valve 240 can vary the flow rate of water supplied from the pump 220 to the first connection port 520.

The control unit 260 controls supply of water to the first connection port 520 at predetermined time intervals. More specifically, the control unit 260 controls opening of the valve 240 at predetermined time intervals.

The chiller unit 300 is attached to the purifying device 600. The chiller unit 300 can cool the water purified by the purifying device 600, and return the water to the purifying device 600 again.

The water supply tank 280 supplies water to the purification tank 620 by an amount reduced due to circulation of water.

(Configuration of Pipe)

Figure 2:
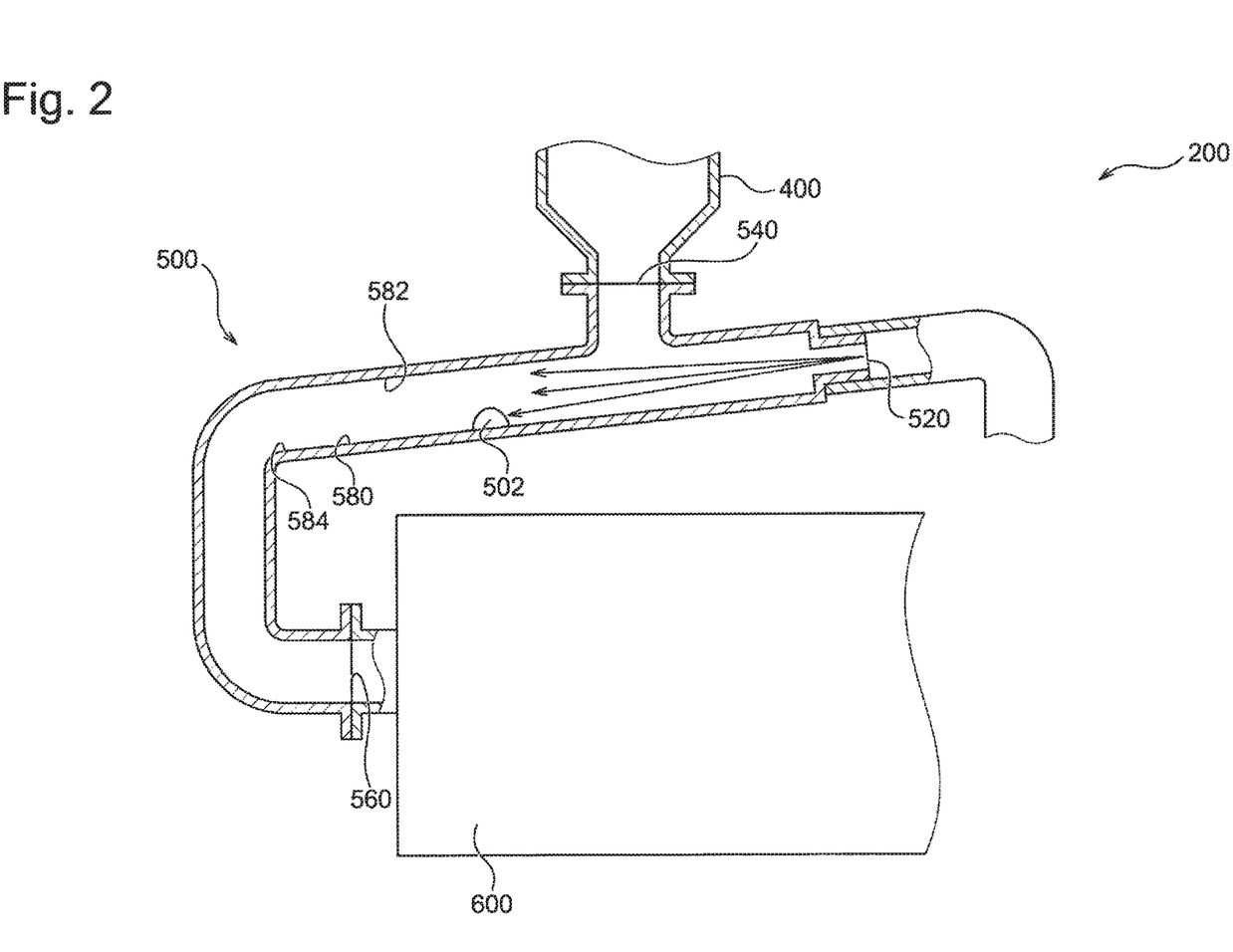
FIG. 2 is a structure diagram showing in detail a pipe portion which connects a separation unit and a purification tank with each other and which is shown in FIG. 1.

Next, the more detailed configuration of the pipe 500 will be described with reference to FIG. 2. FIG. 2 is a structure diagram showing in detail the pipe 500 which connects the separation unit 400 and the purification tank 620 with each other. Referring to FIG. 2, the pipe 500 includes the first connection port 520, a second connection port 540, a third connection port 560, and an inclined portion 580. The second connection port 540 is connected with the separation unit 400. Accordingly, water containing the flux flows into the second connection port 540. Further, the inclined portion 580 is positioned on the downstream side of the second connection port 540, and extends in a direction intersecting with a vertical line extending in a gravity direction. In this specification, "a pipe extends in a certain direction" means that the center line of the pipe extends in the certain direction. Accordingly, the inclined portion 580 is a portion of the pipe 500 having a center line thereof extending in a direction intersecting with a vertical line. Further, the inclined portion 580 includes a straight pipe portion 582 which extends straight. The first connection port 520 is positioned on the upstream side of the inclined portion 580, and is in fluid communication with the above-mentioned pump 220 via the valve 240 (see FIG. 1). A portion of the pipe 500 between a position where the first connection port 520 is formed and a downstream end portion 584 of the straight pipe portion 582 extends straight, and water supplied from the pump 220 is injected toward the straight pipe portion 582 of the inclined portion 580. The water pressure of water supplied by the pump 220 is set such that the pressure of water supplied from the first connection port 520 by the pump 220 is higher than the pressure of water containing the flux and flowing into the pipe 500 from the second connection port 540. Further, the water pressure of water supplied by the pump 220 is set such that a pressure difference between the pressure of water supplied from the first connection port 520 by the pump 220 and a pressure on the downstream side of the inclined portion 580 is 0.1 MPa or more. In this specification, in the case where water which flows through a first point flows through a second point after the water flows through the first point, the first point is defined as the upstream side of the second point, and the second point is defined as the downstream side of the first point.

<Method for Removing Flux>

Next, a method for removing a flux by the flux recovery device 200 will be described. To describe the method for removing a flux by the flux recovery device 200, first, a process where a flux to be removed adheres to the inner wall of the pipe 500 will be described.

In the case where a flux is recovered from a gaseous mixture, the separation unit 400 separates the flux from the gaseous mixture using water. Thereafter, the separation unit 400 discharges the water containing the flux to the pipe 500. Then, the water containing the flux flows into the pipe 500 from the second connection port 540 of the pipe 500, and flows to the purifying device 600 through the inclined portion 580. At this point of operation, as described above, the flux is formed into liquid with a low temperature and high viscosity. Accordingly, in the case where water containing the flux flows through a pipe extending in the gravity direction, the flux does not easily adhere to the inner wall of the pipe. However, in the case where water containing the flux flows into a pipe extending in a direction intersecting with the gravity direction, there is a concern that the flux may adhere to the wall surface of the pipe. That is, there is a concern that the flux may adhere to the inclined portion 580 (see FIG. 2).

Next, the method for removing a flux 502 adhering to the inclined portion 580 will be described.

In the flux recovery device 200, the control unit 260 controls opening of the valve 240 at predetermined time intervals (see FIG. 1). With such an operation, water supplied by the pump 220 is supplied from the first connection port 520 (see FIG. 2). This supplied water flows toward the inclined portion 580. Accordingly, the flux 502 adhering to the inclined portion 580 is flushed out with the water pressure of supplied water. That is, the flux recovery device 200 can remove the flux 502 adhering to the inclined portion 580.

<Manner of Operation and Advantageous Effect>

Next, the manner of operation and advantageous effects of the flux recovery device 200 according to this embodiment will be described hereinafter.

(First Advantageous Effect)

As described above, the flux recovery device 200 has the first connection port 520, connected with the pump 220, on the upstream side of the inclined portion 580. Accordingly, the flux recovery device 200 can flush out the flux 502 adhering to the inclined portion 580 by causing water supplied by the pump 220 to flow from the first connection port 520. Particularly, in the flux recovery device 200, the pressure of water supplied from the first connection port 520 by the pump 220 is higher than the pressure of water containing the flux and flowing into the pipe 500 from the second connection port 540. Accordingly, water supplied from the first connection port 520 can flush out the flux 502 which cannot be flushed out with the water pressure of water supplied from the second connection port 540.

(Second Advantageous Effect)

In the flux recovery device 200, a portion of the pipe 500 between a position where the first connection port 520 is formed and the downstream end portion 584 of the straight pipe portion 582 extends straight so that supplied water is injected toward the straight pipe portion 582. Accordingly, it is possible to flush out the flux 502 adhering to the straight pipe portion 582 with injection pressure.

(Third Advantageous Effect)

In the flux recovery device 200, the pump 220 supplies water to the separation unit 400, and also supplies water to the first connection port 520. Accordingly, it is unnecessary for the flux recovery device 200 to newly include another pump in addition to the pump 220 to remove the flux 502 adhering to the inclined portion 580.

(Fourth Advantageous Effect)

In the flux recovery device 200, the water purified by the purifying device 600 is supplied to the first connection port 520 by the pump 220. Accordingly, the flux recovery device 200 uses the purifying device 600, which is an existing facility, as a water supply source for supplying water to the first connection port 520. That is, it is unnecessary for the flux recovery device 200 to include another water supply source for supplying water used to remove the flux 502 adhering to the inclined portion 580 in addition to the purifying device 600.

(Fifth Advantageous Effect)

The control unit 260 controls opening of the valve 240 at predetermined time intervals. Accordingly, the flux recovery device 200 can remove the flux 502 at predetermined time intervals. That is, the flux recovery device 200 can remove the flux 502 before the adhering flux 502 grows with time and blocking the pipe 500. That is, the flux recovery device 200 can suppress clogging of the pipe 500.

<Modification>

Next, modifications of the flux recovery device 200 according to this embodiment will be described hereinafter.

(First Modification)

In the flux recovery device 200, the pump 220 supplies water to the separation unit 400, and also supplies to the first connection port 520. However, the flux recovery device 200 may include, in addition to the pump 220, another pump which does not supply water to the separation unit 400 but supplies water to the first connection port 520. This is because even if the pump 220 does not supply water to the first connection port 520, another pump can supply water to the first connection port 520.

(Second Modification)

In the flux recovery device 200, the water purified by the purifying device 600 is supplied to the first connection port 520. However, the flux recovery device 200 may include another water supply source in addition to the purifying device 600, and this another water supply source may supply water to the first connection port 520. This is because even if the purifying device 600 does not necessarily act as a water supply source which supplies water to the first connection port 520, the flux recovery device 200 can cause another water supply source to supply water to the first connection port 520.

(Third Modification)

The flux recovery device 200 may not include the valve 240 and the control unit 260. This is because even if water is always injected from the first connection port 520, it is possible to remove a flux adhering to the inclined portion 580.

(Fourth Modification)

The flux recovery device 200 may not include the control unit 260. This is because even if the valve 240 is manually opened or closed, the flux recovery device 200 can remove a flux adhering to the inclined portion 580.

(Fifth Modification)

The flux recovery device 200 may include another pipe or the like between the pipe 500 and the separation unit 400. This is because provided that water containing the flux flows into the pipe 500 from the second connection port 540, the pipe 500 can cause this water flowing into the pipe 500 to flow to the purifying device 600.

(Sixth Modification)

The pipe 500 may has a connection port in addition to the above-mentioned first connection port 520, the second connection port 540, and the third connection port 560.

(Seventh Modification)

In the flux recovery device 200, the control unit 260 controls supply of water at predetermined time intervals. However, a trigger for the control unit 260 to control supply of water is not limited to the lapse of a predetermined time interval. The control unit 260 may controls supply of water using the starting of a device, a predetermined operation of the flux recovery device 200 or other operations as a trigger.

Second Embodiment

<Configuration>

Figure 3:
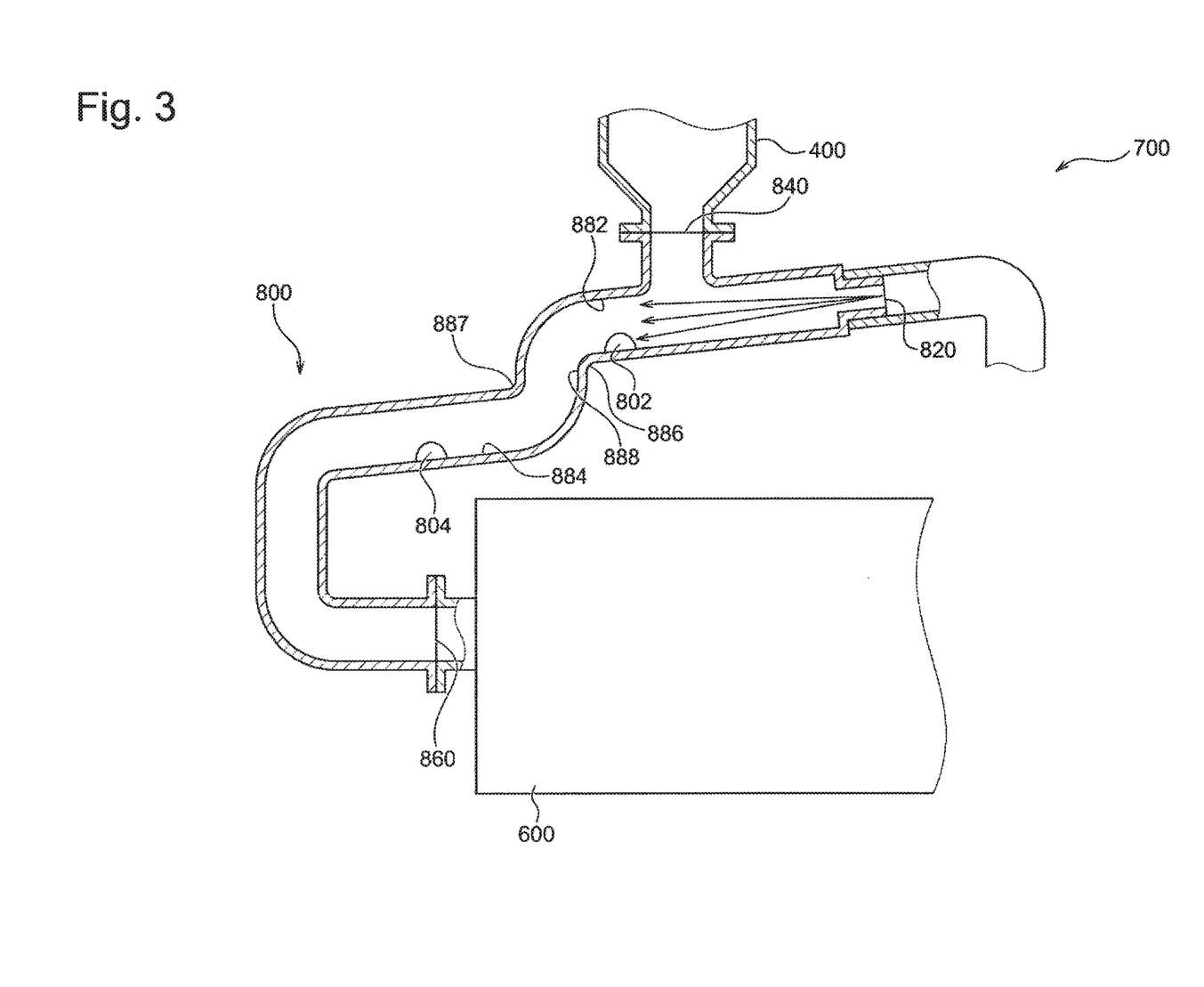
FIG. 3 is a structure diagram showing a configuration of a pipe portion of a flux recovery device according to a second embodiment.

A flux recovery device according to a second embodiment differs from the flux recovery device 200 shown in the first embodiment with respect to the configuration of a pipe portion which connects the separation unit 400 and the purification tank 620 with each other. FIG. 3 is a structure diagram showing the configuration of the pipe portion of the flux recovery device according to the second embodiment. Referring to FIGS. 1 and 3, a flux recovery device 700 includes a pipe 800 which connects the separation unit 400 and the purifying device 600 with each other. The pipe 800 includes a first connection port 820, a second connection port 840, a third connection port 860, a first inclined portion 882, a second inclined portion 884, a first bent portion 886, a second bent portion 887, and a vertical portion 888. Each of the first inclined portion 882 and the second inclined portion 884 may be simply referred to as "inclined portion".

A portion of the pipe 800 between a position where the first connection port 820 is formed and the first bent portion 886 extends straight. However, after the pipe 800 is bent at the first bent portion 886, the pipe 800 extends in the direction of a vertical line and, thereafter, is bent at the second bent portion 887 again. In this embodiment, a portion of the pipe 800 which extends in the direction of the vertical line is referred to as the vertical portion 888. Accordingly, the vertical portion 888 is present between the first inclined portion 882 and the second inclined portion 884, and the vertical portion 888 divides the first inclined portion 882 from the second inclined portion 884. The second connection port 840 is connected with the separation unit 400. Accordingly, water containing the flux flows into the second connection port 840. Further, the first inclined portion 882 and the second inclined portion 884 are positioned on the downstream side of the second connection port 840, and each of the first inclined portion 882 and the second inclined portion 884 extends in a direction intersecting with the vertical line extending in the gravity direction. The first connection port 820 is positioned on the upstream side of the first inclined portion 882 and the second inclined portion 884, and is in fluid communication with the pump 220 via the valve 240 (see FIG. 1). Further, the water pressure of water supplied by the pump 220 is set such that the pressure of water supplied from the first connection port 820 by the pump 220 is higher than the pressure of water containing the flux and flowing into the pipe 800 from the second connection port 840. Further, the water pressure of water supplied by the pump 220 is set such that a pressure difference between the pressure of water supplied from the first connection port 820 by the pump 220 and the pressure on the downstream side of the second connection port 840 is 0.1 MPa or more.

<Manner of Operation and Advantageous Effects>

Next, the manner of operation and advantageous effects of the flux recovery device 700 according to this embodiment will be described hereinafter.

(First Advantageous Effect)

In the same manner as the first embodiment, the flux recovery device 700 can flush out a flux 802 adhering to the first inclined portion 882 with a pressure of supplied water.

(Second Advantageous Effect)

Unlike the first inclined portion 882, the first bent portion 886, the second bent portion 887 and the vertical portion 888 are present on the upstream of the second inclined portion 884. Accordingly, water injected from the first connection port 820 does not directly impinge on the second inclined portion 884. However, the flux recovery device 700 can flush out a flux 804 adhering to the second bent portion 887 with the water pressure of water supplied by the pump 220. That is, the flux recovery device 700 can also flush out a flux at a position where water injected from the first connection port 820 does not directly impinge.

<Modification>

Next, a modification of the flux recovery device 700 according to this embodiment will be described hereinafter.

(First Modification)

The pipe 800 includes two inclined portions consisting of the first inclined portion 882 and the second inclined portion 884. However, the pipe 800 may include three or more inclined portions. This is because it is possible to flush out a flux adhering to the inclined portion on the most downstream side using the pump 220.

The embodiments of the present invention and the respective modifications of the embodiments have been described heretofore. However, the above-mentioned embodiments are provided for facilitating the understanding of the present invention and, as a matter of course, do not limit the present invention. Various modifications and variations are conceivable without departing from the gist of the present invention, and the present invention includes a technique equivalent to the present invention. Further, within a range where at least a portion of the above-mentioned problems can be solved or within a range where at least a portion of the above-mentioned advantageous effects can be acquired, respective constitutional elements described in WHAT IS CLAIMED IS and the specification may be combined or omitted as desired.

REFERENCE SIGNS LIST

100: soldering device
120: solder processing unit
200: flux recovery device
220: pump
240: valve
260: control unit
280: water supply tank
300: chiller unit
320: condensation device
340: blower
400: separation unit
500: pipe
520: first connection port
540: second connection port
560: third connection port
580: inclined portion
582: straight pipe portion
584: downstream end portion
600: purifying device
620: purification tank
640: ozone generator
700: flux recovery device
800: pipe
820: first connection port
840: second connection port
860: third connection port
882: first inclined portion
884: second inclined portion
886: first bent portion
887: second bent portion
888: vertical portion

What is claimed is:

1. A flux recovery device which recovers a flux from a gaseous mixture containing a flux component, the flux recovery device comprising:
    a separation unit configured to separate the flux from the gaseous mixture using water, and to discharge the water containing the flux;
    a pipe including a second connection port, an inclined portion, and a first connection port, the water containing the flux flowing into the pipe from the second connection port, the inclined portion being positioned on a downstream side of the second connection port, and extending in a direction intersecting with a vertical line extending in a gravity direction, and the first connection port being positioned on an upstream side of the inclined portion; and
    a pump configured to supply water from the first connection port.

2. The flux recovery device according to claim 1, wherein a pressure of the water supplied from the first connection port by the pump is higher than a pressure of the water containing the flux and flowing into the pipe from the second connection port.

3. The flux recovery device according to claim 1, wherein a pressure difference between the pressure of the water supplied from the first connection port by the pump and a pressure on a downstream side of the inclined portion is 0.1 MPa or more.

4. The flux recovery device according to claim 1, wherein the inclined portion includes a straight pipe portion which extends straight,
    a portion of the pipe between a position where the first connection port is formed and a downstream end portion of the straight pipe portion extends straight, and
    the water supplied from the pump is injected toward the straight pipe portion.

5. The flux recovery device according to claim 1, wherein the pump supplies the water also to the separation unit.

6. The flux recovery device according to claim 5, further comprising a purifying device to which water containing the flux and discharged from the separation unit is supplied, and which is configured to separate the flux from the water containing the flux to recover the flux, wherein
    the pump supplies, to the first connection port and the separation unit, water separated from the water containing the flux by the purifying device.

7. The flux recovery device according to claim 1, further comprising a control unit configured to control supply of the water supplied to the first connection port by the pump.

8. The flux recovery device according to claim 7, wherein the control unit controls the supply of the water at predetermined time intervals.

9. A soldering device comprising:
    a solder processing unit; and
    the flux recovery device described in claim 1 and configured to recover a flux from a gaseous mixture containing a flux component and generated in the solder processing unit.

* * * * *